United States Patent [19]

Aurness et al.

[11] Patent Number: 5,067,637
[45] Date of Patent: Nov. 26, 1991

[54] CANTEEN BOTTLE FOR DISPENSING RATIONED DRINKS

[76] Inventors: Harold O. Aurness, 5808 Knox Ave. N., Brooklyn Center, Minn. 55430; Tony L. Jones, 1615 Russell Ave. N., Minneapolis, Minn. 55411

[21] Appl. No.: 487,857

[22] Filed: Mar. 5, 1990

[51] Int. Cl.$^5$ ............................................. B67D 5/64
[52] U.S. Cl. .................... 222/175; 222/456; 222/518
[58] Field of Search .............. 222/175, 456, 465.1, 222/518, 520; 215/11.4, 11.1

[56] References Cited

U.S. PATENT DOCUMENTS

| | | | |
|---|---|---|---|
| 2,204,104 | 6/1940 | Masters | 222/456 |
| 2,233,996 | 3/1941 | Dent | 222/456 |
| 4,139,130 | 2/1979 | Glusker et al. | 222/175 X |
| 4,702,473 | 10/1987 | Paquette | 222/175 X |
| 4,712,794 | 12/1987 | Hall | 222/521 X |
| 4,902,261 | 2/1990 | Pratt et al. | 215/11.1 X |
| 4,921,112 | 5/1990 | Juhlin et al. | 222/456 X |

Primary Examiner—Kevin P. Shaver
Assistant Examiner—Gregory L. Huson

[57] ABSTRACT

A rationing container to carry liquid while running or walking is shown as including a narrow bottle with an offset neck and a handle. The bottle is carried tethered in a holder on a person's belt. Drinks in two approximate amounts are dispensed from the bottle through a moveable spring-biased mounthpiece which has a rod extending to a stopper near the bottom of the bottle. The stopper covers an opening between the bottom of a tube extending through the bottle as an extension of the bottle neck and a separate liquid holding chamber which has a small opening to the larger interior of the bottle. The bottom of the mouthpiece includes a plug member which plugs an opening in a fixed gate at the top of the tube. The plug is pulled out of the opening by action of the mouthpiece and is rested on the top of the fixed gate for one rationed drink. For a longer drink the plug member is rested in a recess on the top of the fixed gate allowing liquid from the holding chamber into the tube.

5 Claims, 1 Drawing Sheet

CANTEEN BOTTLE FOR DISPENSING RATIONED DRINKS

FIELD OF THE INVENTION

The present invention relates generally to portion dispensing bottles for liquid to be carried while running or walking.

BACKGROUND OF THE INVENTION

An object of the present invention is for a walker or runner to be able to conveniently carry drinking liquid which can be easily used. Another object of the present invention is to make the liquid last be keeping the user from gulping the liquid by employing limiting means in the bottle to control the flow volume or limiting the amount of liquid consumable at one time.

The prior art, although meeting the needs for rationing liquid, does not have a two tier dispensing system which offers a choice of controlled volume.

The present invention solves the need of runners or walkers for small amounts of liquid to drink without interrupting their activity.

Specifically, a wide bottle with narrow depth with an offset neck and a thumb handle on the offset side on the neck is provided as a container for liquid and as a housing for a rationing means. The juxtaposition of the neck and handle fix the right position of the bottle for drinking. A flared, gasketed, rotatable mouthpiece extends from the neck of the bottle with means in the form of a shelf on a bottom extension to hold a vertical stem leading down the center of a neck tube to a stopper separating the bottom of the neck tube from a holding chamber in the bottom of the bottle.

The bottom of the shelf of the mouthpiece also provides a plug which can lift and pivot in the neck to open a stationary gate which keeps the bottle closed. When drinking, the mouthpiece, pulled by the mouth, removes the plug from the passage hole in the stationary gate which lets all the liquid in the neck tube into the mouthpiece while the stopper seals the bottom of the neck tube from the holding chamber. The stopper is aligned at the bottom of the neck tube by a spacer which lets the liquid flow around it through the neck tube.

The holding chamber is formed by a separate wall in the bottom of the bottle, isolating a portion of the interior, with a hole placed in the bottom of the wall which lets liquid into the holding chamber only when the bottle is upright. For an additional ration the plug of the mouthpiece is swiveled to a recess in the top of the stationary gate which creates a gap between the stopper and the neck tube which lets all the liquid in the holding chamber through to the mouthpiece.

A small relief chamber, isolated from the main interior of the bottle by the neck tube, has a small access hole to the top of the holding chamber and which enhances the filling of the bottle which is accomplished through an entrance hole on the narrow side near the neck and closed by a flexible plug.

The bottle is carried in a holder attached to a base attachable to a runner's belt. A pivoting reel on the holder extends a retractable ribbon to the handle of the bottle which pulls and guides the bottle back to the holder after a drink.

DESCRIPTION OF THE PREFERRED EMBODIMENT

Figures 1, 2:
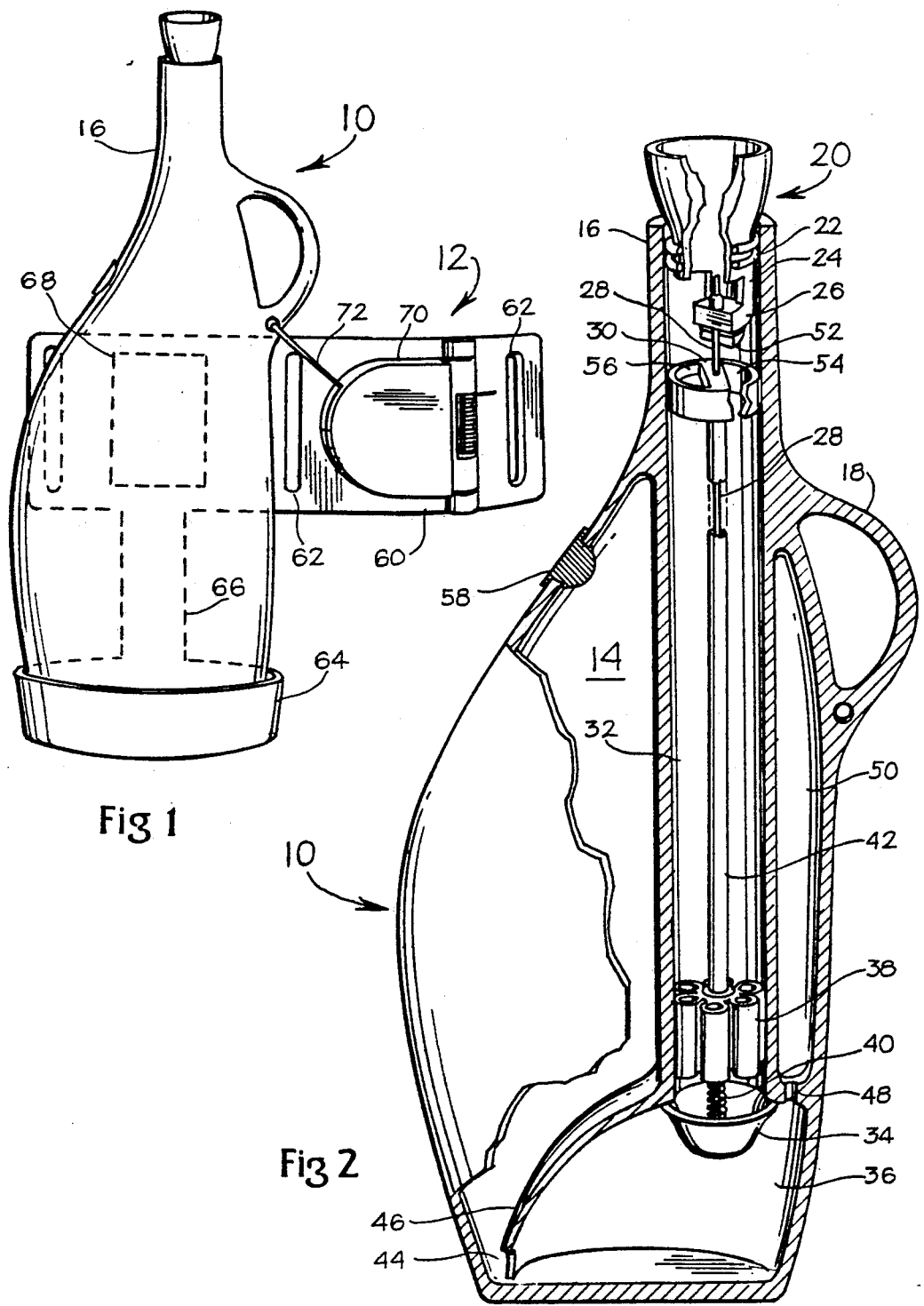
FIG. 1 shows a perspective view of a carry bottle unit in a holder unit.
FIG. 2 shows a cross-sectional view of the bottle unit.

A bottle unit which rations liquid by pre-measuring is shown in the drawings and designated 10. Unit 10 is attachable to a holder 12 which is attached to a person's belt while running or walking.

Unit 10 comprises a bottle housing 14 with an oval cross section with a round neck 16 at the top offset from the center and with a closed handle 18 near the top on the offset side of the neck. Unit 10 further comprises a tubular mouthpiece 20 flared at the top and rotatable within the bottleneck 16. The mouthpiece 20 diminishes within the neck 16 to allow for two ring gaskets 22 encircling the mouthpiece 20 horizontally just below the mouth of the bottle 14. At the open bottom of the mouthpiece 20 a vertical extension 24 from one side drops a short distance to hold a shelf 26 which extends horizontally to the center of the bottleneck 16. The shelf 26 holds the top end of a stopper stem 28 extending down the center of the bottleneck 16, through the center of a stationary gate 30 which limits the liquid flow, to a neck tube 32, an extension of the bottleneck 16, and down to the center of a flexible, inverted bell-shaped stopper 34 covering the bottom of the neck tube 32. The stopper 34 separates the neck tube 32 from a holding chamber 36 in the bottom of the bottle 14.

Near the bottom of the neck tube 32 above the stopper 34 is a flexible tube spacer 38 through which the stopper stem 28 extends which keeps the stem centered in the neck tube 32 which, in turn, keeps the stopper 34 centered over the bottom opening of the neck tube 32. The tube spacer 38 is a short length of flexible material consisting of parallel vertical tubes formed symetrically around a solid center which lets the liquid pass through. A spiral spring extends between the stopper 34 and the tube spacer 38 and acts as a flexible vertical spacer 40 to keep the tube spacer 38 from interferring with the stopper 34. The flexible tube spacer 38 is kept from rising on the stopper stem 28 by a rigid spacer tube 42 extending on the stopper stem from the tube spacer 38 to the stationary gate 30.

The said holding chamber 36 in the bottom of the bottle housing 14 holds an approximate predetermined number of ounces of liquid which flow into it from a small access hole 44 at the bottom of the holding chamber wall 46. The wall 46 arches down on the wide side of the bottle 14 to separate the holding chamber from the main interior of the bottle. A second hole 48 is located at the top of the holding chamber 36 near the stopper 34 which leads to a small vertical interior space 50, isolated from the larger main interior of the bottle by the tube 32 and acts as a relief chamber for air and liquid when the bottle is being filled.

When used for a drink unit 10 is tilted to the mouth by putting a thumb through the handle 18 with the other fingers grasping the neck 16 which action puts the bottle in the right position to work well. The neck tube 32, partially filled with liquid, becomes completely filled from the holding chamber 36. The user pulls and twists the mouthpiece 20 with his teeth which pulls a gasketed plug 52 under the mouthpiece shelf 26, out of a passage hole 54 on the offset side of the stationary gate 30 and rests it on the top of the gate. This combined action tightens the stopper 34 to the bottom of the neck tube 32 holding back the rest of the liquid in the holding chamber 36. For a larger drink the mouthpiece 20 is twisted to the other side of the stationary gate 30 where the gasketed plug 52 is allowed to rest in a shallow depression 56 of the gate. This leaves the stopper 34 slightly open at the bottom of the neck tube 32 allowing the rest of the liquid in the holding chamber 36 to enter the neck tube 32. When through drinking the gasketed plug 52 is twisted back into the passage hole 54 of the stationary gate 30.

Unit 10 is filled at a stoppered hole 58 near the neck of the unit.

Unit 10 is held on holder 12 which comprises a base member 60 with slots 62 for attaching to a belt and a shallow holster 64 to hold the bottle 14 which connects to the base member 60 by a short extension piece 66 which may also include a piece of velcro 68 attached to it matching a piece of velcro on the bottle 14. Unit 12 further comprises a covered reel 70 spring-biased to lay flat on the base member 60 and swivel horizontally. The reel 70 extends a retractable ribbon 72 to attach to the base of the bottle handle 18. This arrangement allows the bottle to reach the user's mouth and gives him/her confidence in handling the bottle while running.

We claim:

1. In a canteen bottle attachable to a carrying device on a running or walking person which can dispense a premeasured ration of liquid comprising a bottle of general bottle shape with a round neck offset at the top of the bottle, a handle near the neck, a capped filling hole, a rotatable mouthpiece extending from the bottle neck and gasketed therein, a holding shelf on the bottom of the mouthpiece to firmly hold the top end of a stopper stem reaching to a pliable stopper covering a hole in the top of a holding chamber in the bottom of the bottle, and which holding shelf also provides a plug member to fit a passage hole in a stationary gate in the bottle neck which allows passage of liquid into the mouthpiece from a neck tube which is an extension of the bottle neck below the stationary gate going to the holding chamber, and with a recess in the top of the stationary gate to fit the plug member of the holding shelf to hold the stopper in a partially open position; a flexible tube spacer on the stopper stem to hold the stopper stem centered in the neck tube to keep the stopper aligned with the holding chamber hole, a rigid spacer tube extending on the stopper stem between the stationary gate and the flexible tube spacer to hold the flexible tube spacer from vertical slippage, with a spiral spring spacer between the stopper and the flexible tube spacer to keep the stopper in a normal open position until the bottle is used for a drink; a relief chamber alongside the neck tube with access through a bottom hole to the holding chamber; an access opening in the wall of the holding chamber to a reservoir for liquid in the interior of the bottle whereby the liquid may flow into the holding chamber and neck tube around the stopper in open position and be trapped by the stopper in closed, or drinking position; further comprising a carrying device attachable to the user with a variable tether means connecting the bottle and the carrying device.

2. The canteen bottle of claim 1 wherein the mouthpiece comprises a generally tubular shape, with a flared upper portion extending beyond the top of the bottle neck with the lower part of the flared portion being thicker for strength and tapering toward the top, a lower part of the mouthpiece featuring ring gaskets to prevent leakage through the bottle neck, a short downward extension of a section of the circumference of the mouthpiece wall holding a shelf member extending laterally to beyond the center of the bottle neck to hold the top end of a stopper stem extending down through the shelf; with the mouthpiece further comprising a plug member located on the underside of the shelf member next to the stopper stem which, when used for a drink, is pulled out of the passage hole in the stationary gate to sit on the top of the stationary gate at the edge of the passage hole.

3. The canteen bottle of claim 1 wherein the bottle is shaped with the neck off center and a thumb handle on the top offset side to assure that the bottle is in the right position for drinking when grasped.

4. The canteen bottle of claim 1 wherein the ration measuring is accomplished by means comprising a holding chamber in the bottom of the bottle with an access hole to the main interior of the bottle placed at the bottom of the wall separating the two areas, which holding chamber isolates a certain number of ounces of the liquid in the bottle in the holding chamber; with another liquid holding area above the holding chamber in a neck tube separated by a stopper which seals it, isolating, if filled, another measured amount of liquid, wherein the carry bottle can offer a small, rationed drink of several ounces to the mouthpiece or, an added larger ration of liquid by control of the stopper through the mouthpiece.

5. The canteen bottle of claim 1 wherein the flexible tube spacer comprises a plurality of short flexible parallel tubes disposed around a core and which fills the diameter of the neck tube, with the stem of the stopper extending tightly through the center of the core and which keeps the stopper circumference aligned with the circumference of the hole in the top of the holding chamber while allowing liquid to flow freely to the stationary gate and the mouthpiece when in an open mode.

* * * * *